United States Patent [19]
Vitek et al.

[11] Patent Number: 5,944,343
[45] Date of Patent: Aug. 31, 1999

[54] MINIATURE INFLATOR

[75] Inventors: Janie M. Vitek, Commerce; John M. Slager, Rochester Hills, both of Mich.

[73] Assignee: Automotive Systems Laboratory, Inc., Farmington Hills, Mich.

[21] Appl. No.: 08/916,137

[22] Filed: Aug. 21, 1997

[51] Int. Cl.⁶ .................................................. B60R 21/26
[52] U.S. Cl. ........................................ 280/736; 280/741
[58] Field of Search ................................. 280/736, 741, 280/740; 102/530, 531; 422/164

[56] References Cited

U.S. PATENT DOCUMENTS

| | | | |
|---|---|---|---|
| 34,615 | 3/1862 | Shannon . | |
| 2,529,791 | 11/1950 | Whitworth et al. | 102/39 |
| 3,739,574 | 6/1973 | Godfrey | 60/39.03 |
| 3,797,854 | 3/1974 | Poole et al. | 280/150 |
| 4,109,578 | 8/1978 | Gotez | 102/39 |
| 4,131,299 | 12/1978 | Ono et al. | 280/736 |
| 4,296,084 | 10/1981 | Adams et al. | 423/351 |
| 4,414,902 | 11/1983 | Strasser et al. | 102/531 |
| 4,530,516 | 7/1985 | Adams et al. | 280/741 |
| 4,561,675 | 12/1985 | Adams et al. | 280/734 |
| 4,722,551 | 2/1988 | Adams | 280/736 |
| 4,943,086 | 7/1990 | Cunningham | 280/741 |
| 5,005,486 | 4/1991 | Lenzen | 102/531 |
| 5,009,855 | 4/1991 | Nilsson | 422/164 |
| 5,033,390 | 7/1991 | Minert et al. | 102/530 |
| 5,048,862 | 9/1991 | Bender et al. | 280/736 |
| 5,056,815 | 10/1991 | Geisreiter | 280/736 |
| 5,062,367 | 11/1991 | Hayashi et al. | 102/530 |
| 5,215,721 | 6/1993 | Tasaki et al. | 422/165 |
| 5,268,013 | 12/1993 | Bruncher et al. | 55/486 |
| 5,275,433 | 1/1994 | Klober et al. | 280/741 |
| 5,294,414 | 3/1994 | Brede et al. | 422/305 |
| 5,345,875 | 9/1994 | Anderson | 102/530 |
| 5,397,543 | 3/1995 | Anderson | 422/165 |
| 5,551,724 | 9/1996 | Armstrong, III et al. | 280/741 |
| 5,564,738 | 10/1996 | Johnson | 280/736 |
| 5,738,373 | 4/1998 | Siddiqui | 280/740 |
| 5,829,784 | 11/1998 | Brown et al. | 280/737 |

*Primary Examiner*—Christopher P. Ellis
*Attorney, Agent, or Firm*—Lyon, P.C.

[57] ABSTRACT

A gas generator of a side impact air bag inflator comprises a propellant chamber having a proximate and distal end and a plurality of apertures radially disposed about said distal end. Upon combustion of propellant within the chamber, longitudinal flow of the resulting gases is created by virtue of the distal end apertures. Longitudinal gas flow through the chamber and then axially opposite through a filter quickens the deployment rate, and improves the filtering and cooling capability of a smaller side impact inflator.

1 Claim, 1 Drawing Sheet

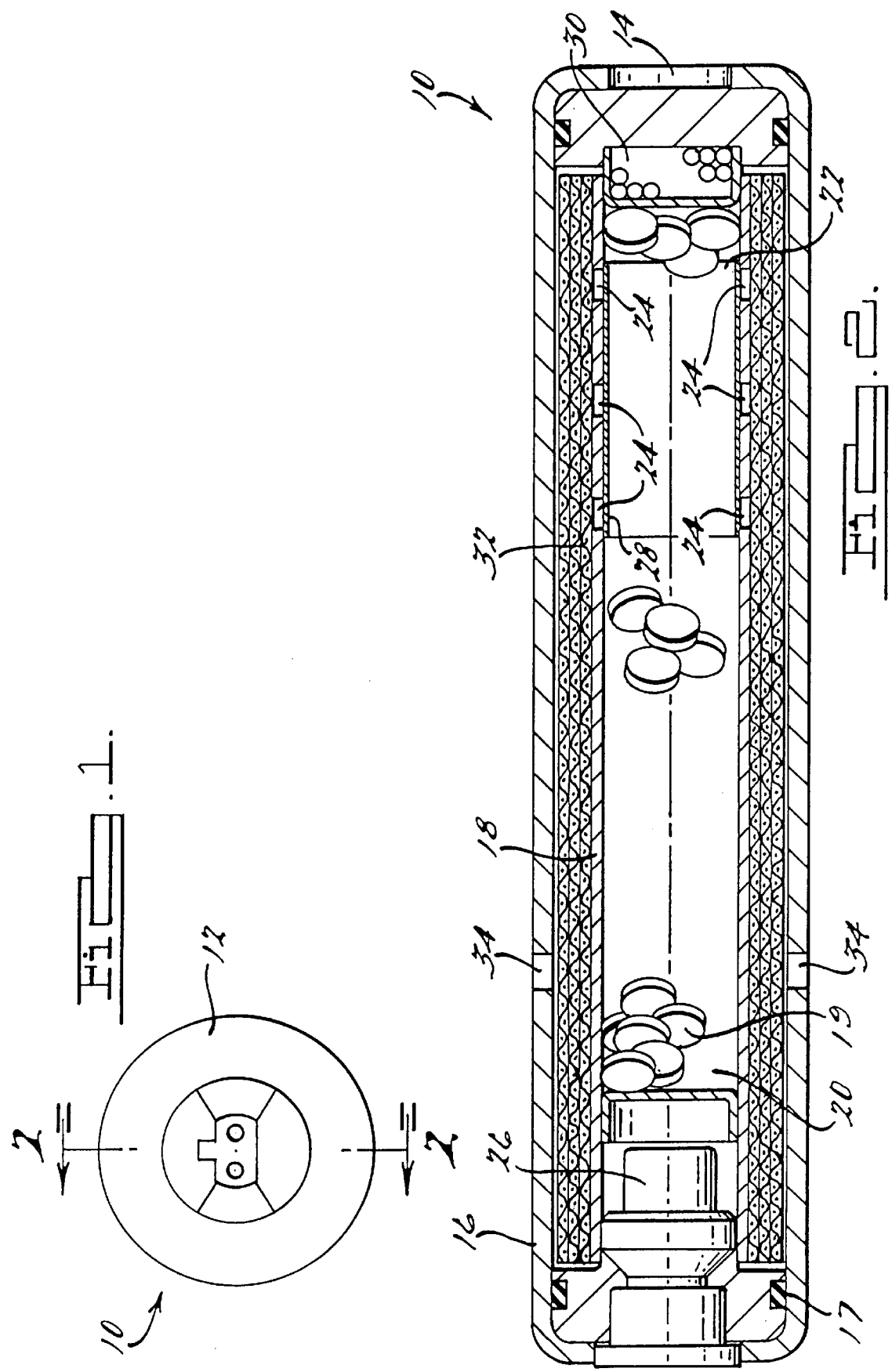

MINIATURE INFLATOR

BACKGROUND OF THE INVENTION

The present invention relates generally to side impact gas inflators for automotive passenger restraint systems, and more specifically, to a gas generator therein for improved cooling of combustion gases.

Certain features of a conventional forward-mounted airbag prevent its corresponding use as a side impact airbag. The size of the inflator constitutes one primary difference. The speed of deployment is yet another difference; to meet design specifications, side impact airbags must deploy significantly faster than forward-mounted airbags. Generally speaking, side impact inflators that are stored within the seat are desirable. One drawback, however, is that the size of the inflator may significantly detract from the comfort of the seat. Because of this, many known forward-mounted inflator systems are simply to large and to slow to function as a seat-mounted side impact airbag. It is therefore desirable that the side impact inflator be substantially smaller and deploy significantly faster than its forward-mounted counterpart.

The size limitation may pose several disadvantages with regard to inflator operability. For example, heat, as well as particulates, in the combustion of gases produced by a pyrotechnic inflator of a vehicle occupant restraint system, must be attenuated prior to discharge thereof into the passenger compartment of the vehicle. While the industry has been successful in meeting current standards through the use of azide propellants, the advent of a new class of nonazide propellants has complicated the problem due to high combustion temperatures and due to the characteristics of particulate combustion. A reduction in inflator size would likely correspond to a reduction in the size of the filter and heat sink within the gas generator. Because nonazide fuels, as compared to azide fuels, generally combust at greater temperatures, a more effective heat sink is required to shield the occupants from high heat exposure during airbag deployment. Additionally, the smaller inflator must be equipped with a filter that will effectively separate the solid and gaseous products of combustion. It is therefore further desirable that a smaller side airbag be equipped with a heat sink and filter every bit as effective as those within a conventional inflator.

Finally, the smaller airbag must deploy within 30 milliseconds or less to ensure occupant protection. Any longer deployment speed significantly detracts from the usefulness and protective capability of a side impact airbag. Therefore, although a smaller inflator will often correspond to a smaller amount of propellant, the gas generating capabilities must sufficiently pressurize the airbag and must also result in deployment speeds faster than those associated with larger inflators.

Thus, there is a requirement for a side impact airbag inflator that rapidly deploys and utilizes the many attributes of a non-azide propellant, and yet meets all current and projected standards for heat attenuation and particulate filtration from the gas produced.

SUMMARY OF THE INVENTION

The aforesaid problem is solved, in accordance with a preferred constructed embodiment of the present invention, by a gas generator comprising a propellant chamber having a propellant bed that is ignitable at a first end of the chamber and through which combustion proceeds to a second end of the chamber. The products formed from combustion are then forced radially out of the second end and flow longitudinally back towards the first end through a filter and heat sink assembly. The resulting gases are then forced out of inflation ports located in the generator housing at the first end of the generator. The generator comprises a plurality of apertures fixed at the second end of the propellant chamber. The chamber apertures fluidly communicate with the filter and heat sink assembly, thereby facilitating longitudinal flow of the combustion gases down through the propellant chamber and then up through the filter assembly.

BRIEF DESCRIPTION OF THE DRAWINGS

FIG. 1 is a cross-sectional view of an automotive air bag inflator constructed in accordance with the instant invention; and FIG. 2 is a sectional elevation of an automotive air bag inflator taken along the line 2—2 of FIG. 1.

DETAILED DESCRIPTION OF THE PREFERRED EMBODIMENT(S)

As shown in FIGS. 1 and 2, in accordance with an exemplary constructed embodiment of the invention, an improved side impact airbag inflator 10 comprises a housing 12, for example, an aluminum forging, having steel tubing comprising a first end closure 14 at one end, and a second end-closure 16 at the opposite end, both of which are crimped in place. An O-ring 17 provides proper sealing. A propellant chamber or tube 18 having a proximal end 20 and a distal end 22 is centrally and longitudinally disposed within housing 12. A plurality of exhaust perforations 24 are formed in the tube 18 only about the distal end 22.

The end-closure 16 accepts an electric igniter 26, which initiates combustion of the propellant 19 within propellant chamber 18 in a manner well known to one skilled in the art. A burst foil 28 may be provided along the inner edge of distal end 22 and over the apertures 24, thereby facilitating pressure buildup and flame front propagation through the propellant 19 disposed internally of the propellant chamber 18.

An autoignition assembly or self-igniter 30 is also disposed within propellant chamber 18 at distal end 22, and functions as an auxiliary igniter. A filter assembly 32 is positioned radially outwardly about the propellant chamber 18, and provides a flow path for the inflation gas to reach inflation ports 34.

In operation, the electric initiator 26 is fired into the propellant chamber 18. As gas is generated, it flows downward through the propellant bed to insure that all propellant in the chamber is ignited quickly. In the preferred embodiment, the present invention may utilize relatively smaller propellant pellets. As shown by the arrows in FIG. 2, gas radially exits the propellant chamber through the perforated holes 24 located only in the lower or axially outward portion of the combustion chamber relative to the initiator. The gas then flows upward through the filter screen 32 to cool the gas and capture any solid particulates therein. The gas then exits the inflator via inflation ports 34.

In accordance with the present invention, an axial or longitudinal gas flow path is generated by virtue of the position of apertures 24. Once the propellant grains 19 are ignited at the first end of chamber 18, the small size of the propellant grains combined with the location of the apertures 24 accelerates the heat and gases through the propellant bed and increases the rate of combustion. After combustion gases radially exit chamber 18 through apertures 24, the gases flow radially and longitudinally back through the filter 32. As such, the gases are sufficiently filtered and cooled prior to exiting the generator through the ports 34, even though the generator 10 is smaller than those normally utilized in conventional forward-mounted inflator systems.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

We claim:

1. In an air bag inflator comprising an elongated cylindrical housing having a proximate end, a distal end and a first plurality of radially opening circumferentially-disposed apertures at the proximate end;

a propellant chamber disposed centrally of said housing comprising proximate and distal ends corresponding to the proximate and distal ends of said housing;

a second plurality of apertures radially disposed about the distal end of said propellant chamber for directing combustion gases radially from said chamber;

a propellant in said chamber;

means for igniting said propellant at the proximate end of said propellant chamber; and an elongated cylindrical filter coextensive with said housing and disposed radially outwardly of said propellant chamber and radially inwardly of an inner wall of said housing.

* * * * *